Oct. 12, 1954 R. ADLER 2,691,697

OVERLOAD COMPENSATING NETWORK FOR KEYED AUTOMATIC GAIN CONTROL NETWORK

Filed Nov. 19, 1949 2 Sheets-Sheet 1

ROBERT ADLER
*INVENTOR.*

BY Francis W. Crotty

HIS ATTORNEY

ROBERT ADLER
*INVENTOR.*

BY Francis W. Crotty

HIS ATTORNEY

Patented Oct. 12, 1954

2,691,697

UNITED STATES PATENT OFFICE 2,691,697

OVERLOAD COMPENSATING NETWORK FOR KEYED AUTOMATIC GAIN CONTROL NETWORK

Robert Adler, Chicago, Ill., assignor to Zenith Radio Corporation, a corporation of Illinois Application November 19, 1949, Serial No. 128,260

4 Claims. (Cl. 178—7.3)

Figure 1:
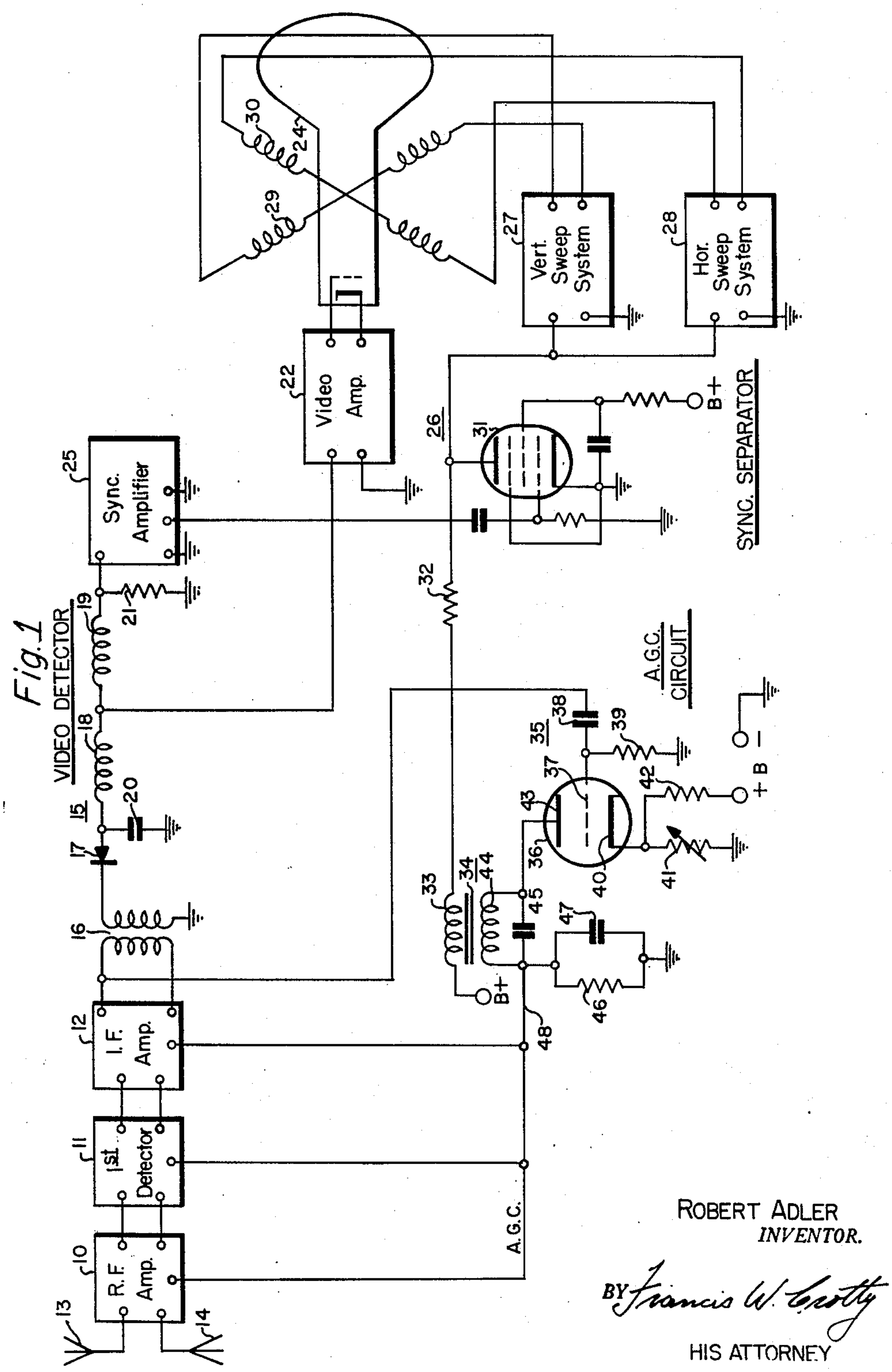

This invention relates to an overload compensating network for a gated automatic gain control system for use in television receivers or the like; and more particularly to an overload compensating network which is especially useful in preventing paralysis of a television receiver during the reception of extremely strong signals.

It is well known in the radio art to employ automatic gain control circuits in which the derived control potential is proportional to the average value of a received carrier wave. Such circuits function to maintain the average value of the incoming carrier wave substantially constant. This is desirable in radio systems since the average value of the transmitted carrier wave is constant and it is desired that the average value of the received carrier wave likewise be maintained constant in spite of variations in field strength of the radiated wave.

In the television art, however, a very different situation obtains. The video-signal components of a received television signal are no accurate indication of signal strength. If a type of gain control circuit such as is used in radio receivers were utilized in a television receiver, the gain of the receiver would be controlled in accordance with the average strength of the video components. However, this average value of the video components varies widely in each television signal as the televised scene shifts in shade values from white to black. To control the gain of a television receiver in accordance with the average value of the video components of a received television signal would, in effect, give rise to a wide variation in the amplitude of the synchronizing components of the signal and interfere with the synchronization of the receiver.

To overcome the objections of the usual type of automatic gain control circuit used in radio receivers, such circuits for use in television receivers have been proposed that respond to the peaks of the synchronizing-signal components of a received television signal. This latter type of automatic gain control circuit develops a control potential having amplitude variations corresponding to amplitude variations of these peaks and independent of average amplitude variations of the video components of the television signal.

The chief objection to this latter type of automatic gain control circuit is that noise signals received concurrently with the television signal cause extraneous amplitude variations of the gain control signal and have a deleterious effect on the automatic gain control of the receiver.

This objection is overcome in the automatic gain control circuit disclosed in copending application Serial No. 39,368, filed July 17, 1948, entitled "Automatic Gain Control Circuit for Television Receivers," Albert Cotsworth III, now Patent 2,593,011, issued April 15, 1952, and assigned to the present assignee. The circuit disclosed in this copending application is rendered sensitive only during recurring intervals corresponding to the horizontal synchronizing pulse intervals. This is accomplished by deriving a gating signal from the horizontal sweep system of the television receiver and utilizing this signal to excite the electron-discharge device in the automatic gain control circuit. When such a circuit is used in a television receiver the gain control signal developed thereby is substantially independent of noise pulses and the like occurring during trace intervals because the control circuit is rendered insensitive by the gating signal during these latter intervals.

The automatic gain control circuit of the aforementioned application has proved highly satisfactory and has gained wide acceptance in the television art. However, certain difficulties have been encountered in the use of this control circuit. In particular, since the gating signal is derived from the horizontal sweep system, this gating signal has the correct phase to provide proper operation of the control circuit only when the sweep system is itself synchronized with a received television signal. When the television receiver is first energized, or when it is tuned from one signal channel to another, there is an interval when synchronization between the horizontal sweep system and the received television signal may not exist. During this interval the automatic gain control level of the receiver is not properly established, and this renders it even more difficult for the sweep system to reach a synchronized state. Thus, if the free-running frequency of the horizontal sweep system falls outside a very restricted frequency range, synchronism may not be established between the receiver and the received signal.

The present invention provides an automatic gain control circuit for a television receiver, similar in some respects to the control circuit of the aforementioned application, but in which the gating signal is derived from the synchronizing signal separator of the television receiver, whereby correct synchronization between the sweep system and a received television signal is not a prerequisite to proper operation of the control circuit.

It is, accordingly, an object of this invention to provide an improved automatic gain control circuit for use in television receivers and the like, which circuit generates a control signal having amplitude variations substantially independent of noise impulses and other undesired extraneous signals received concurrently with an incoming television signal.

Yet another object of this invention is to provide such an improved automatic gain control circuit that continues to function properly to control the gain of a television receiver, even when the receiver is tuned from one signal channel to another, or when the receiver is initially energized.

It is a particular object of this invention to provide an overload compensating network for use in conjunction with a gated automatic gain control system of a television receiver to prevent paralysis of the television receiver and consequent loss of synchronization during the reception of extremely strong signals.

Figure 2:
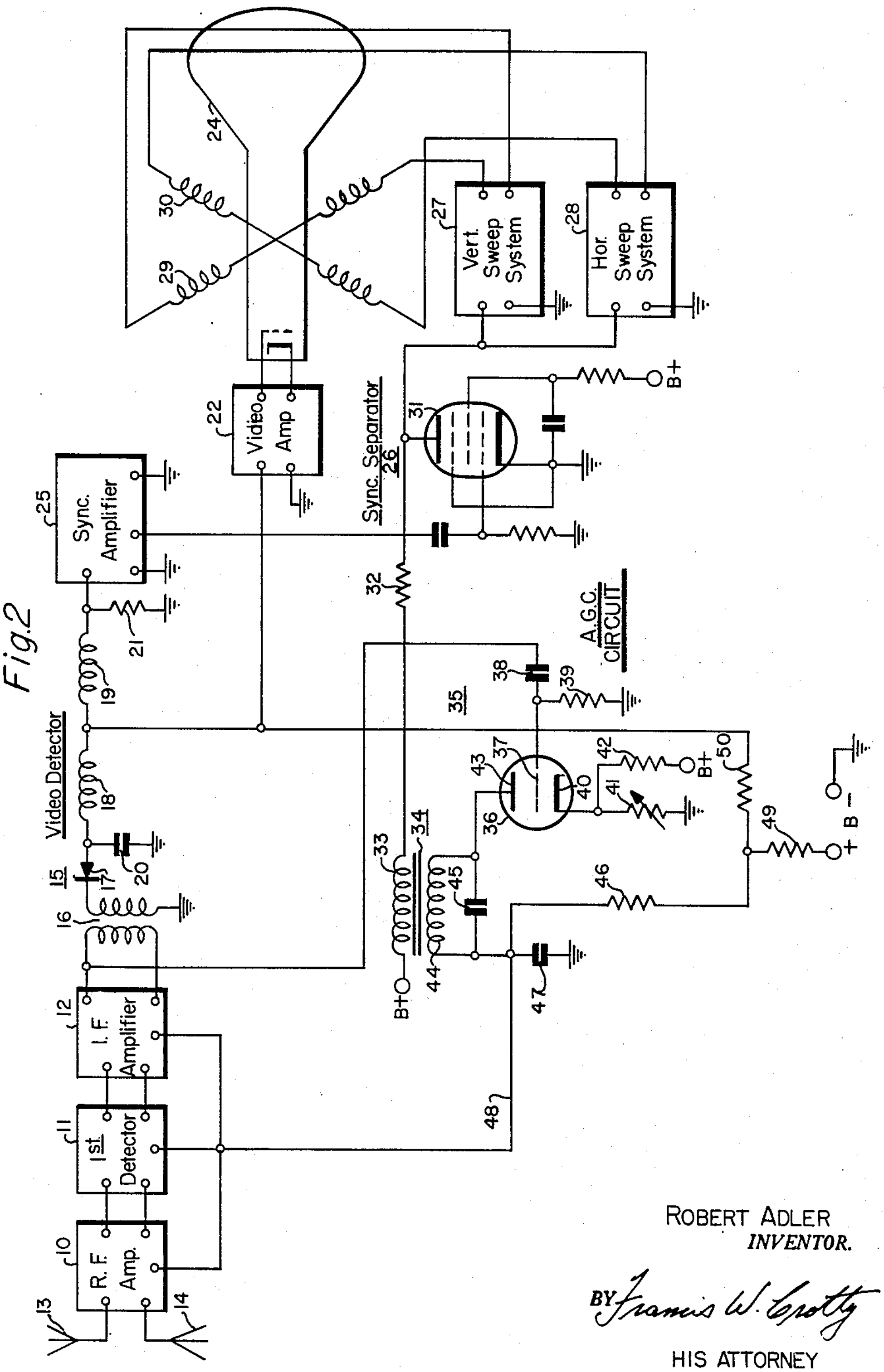

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings, in which:

Figure 1 illustrates one embodiment of the invention incorporated into a television receiver, and Figure 2 illustrates a second embodiment of the invention similarly incorporated into a television receiver.

The television receiver of Figure 1 includes a radio-frequency amplifier 10 of one or more stages, a first detector 11, and an intermediate-frequency amplifier 12 of any desired number of stages, all constructed and connected together in well-known fashion. The radio-frequency amplifier 10 may be coupled to any suitable antenna circuit 13, 14 and the output terminals of the intermediate-frequency amplifier 12 are coupled to a video detector 15 through a coupling transformer 16.

The video detector 15 includes a germanium rectifier 17, or any other suitable detecting device. A pair of series-connected video-frequency peaking coils 18, 19 are coupled to the rectifier 17, one extremity of these coils being by-passed to ground by intermediate frequency by-passing capacitor 20, and the other extremity being connected to ground through a load resistor 21. The junction of the coils 18, 19 is connected to a video amplifier 22, the output terminals of which are connected to the control electrode and cathode of a cathode-ray image reproducing device 24.

The junction of peaking coil 19 and load resistor 21 is connected to a synchronizing-signal amplifier 25, the output terminals of which are connected to a synchronizing-signal separator circuit 26. The separator circuit 26 is, in turn, connected to a vertical-sweep system 27 and to a horizontal-sweep system 28. The output terminals of the vertical-sweep system 27 are connected to vertical-deflecting elements 29 of the device 24, and the output terminals of the horizontal-sweep system 28 are connected to horizontal-deflecting elements 30 of the device.

The television receiver thus far described is quite well known and similar to existing television receivers. A television signal intercepted by the antenna circuit 13, 14 is amplified by the radio-frequency amplifier 10 and heterodyned to the selected intermediate frequency of the receiver in first detector 11. The resulting intermediate-frequency signal is amplified in the amplifier 12, and the composite video signal is derived therefrom by means of video detector 15. The video signal is amplified in video amplifier 22 and applied to the control electrode of reproducing device 24 to control the intensity of the cathode ray in the device in accordance with the video intelligence.

The composite video signal is also amplified in the synchronizing-signal amplifier 25, and the synchronizing-signal components thereof are recovered by means of the separator circuit 26. These synchronizing-signal components are used to synchronize the sweep systems 27, 28 with the received television signal and these sweep systems, in turn, cause the elements 29, 30 to deflect the cathode ray in device 24 at the proper rate so that this device reproduces an image of the picture represented by the television signal.

The synchronizing-signal separator circuit 26 includes an electron-discharge device 31. The anode of device 31 is connected to the positive terminal B+ of a source of unidirectional potential through a load resistor 32 and the primary winding 33 of a transformer 34. The transformer 34 is included in the circuit of the automatic gain control circuit 35 constructed in accordance with the present invention. The circuit 35 includes an electron-discharge device 36. Control electrode 37 of device 36 is coupled to an output terminal of the intermediate-frequency amplifier 12 through a coupling capacitor 38, and is connected to ground through a grid-leak resistor 39. The cathode 40 of device 36 is connected to ground through a variable resistor 41 and to the positive terminal B+ of a source of unidirectional potential through a resistor 42, the resistors 41 and 42 forming a potentiometer between the positive terminal B+ and ground.

The anode 43 of device 36 is connected to one terminal of the secondary winding 44 of transformer 34, this winding being shunted by a capacitor 45 to form a network tuned to resonate at the repetition frequency of the horizontal synchronizing-signal components of the received television signal. The other terminal of the winding 44 is connected to ground through an integrating network comprising a resistor 46 shunted by a capacitor 47. A lead 48 is connected to the junction of the terminal of winding 44 and resistor 46, and this lead supplies an automatic gain control signal to the various stages of the receiver such as the radio-frequency amplifier 10, first detector 11 and intermediate-frequency amplifier 12, as shown.

The synchronizing-signal separator stage 26 is constructed in known manner so that the discharge device 31 clips the synchronizing-signal components from the composite video signal impressed thereon, and additionally limits the amplitude of the peaks of these components. In this manner, pulses are obtained in the anode circuit of the device having an amplitude substantially independent of intensity variations of the signal applied to the device. These pulses are applied to the winding 33 which is included in the anode circuit of discharge device 31 and shock-excite the tuned circuit 44, 45 which preferably has a high quality factor (Q). The circuit 44, 45 produces, therefore, a sine wave having a phase and frequency corresponding to the phase and repetition frequency of the horizontal synchronizing-signal components of the received television signal.

The intermediate-frequency signal produced in response to a received television signal is applied to the control electrode 37 of device 36 from the output terminal of the intermediate-frequency amplifier 12. The device 36 is biased by means of the potentiometer 41, 42 so that it is conductive only during the coincidence of the peaks of the horizontal synchronizing-signal components of the intermediate-frequency signal and the positive amplitude peaks of the sine wave potential applied to anode 43. Noise pulses occurring at intervals other than those of the horizontal synchronizing-signal components are ineffective since the anode potential of device 36 is not high enough at these other intervals to allow the device to translate such pulses.

The integrating network 46, 47 is included in the anode circuit of device 36, and the time constant of this network is made such that a unidirectional potential, negative with respect to ground, appears thereacross with amplitude variations corresponding to the amplitude variations of the peaks of the horizontal synchronizing signal components of a received television signal. This potential constitutes the automatic gain control signal of the receiver and is applied to the various stages thereof by way of lead 48 to maintain the gain of the receiver substantially constant for intensity variations of a received television signal.

Since the gating signal of the automatic gain control circuit of the present invention is derived from the synchronizing-signal separator stage 26 and not from the horizontal sweep system, the automatic gain control signal produced thereby is not dependent upon synchronization of the sweep system, and the previously discussed disadvantage sometimes present in the systems disclosed in the aforementioned copending application is obviated. In addition, since the horizontal synchronizing pulses themselves are used to shock-excite the tuned circuit 44, 45, proper phasing between these synchronizing pulses as applied to control electrode 37 and the gating signal applied to anode 43 is assured.

In the embodiment of the invention disclosed in Figure 1, difficulties may sometimes be encountered when the television receiver is first energized or first tuned to a high intensity television signal. These difficulties arise due to the fact that the insufficient automatic gain potential originally present may permit overloading of the amplifier stage 25 preceding the synchronizing-signal separator. Therefore, no synchronizing pulses may be produced by the separator and no sine wave potential is developed by the circuit 44, 45 so that the automatic gain control circuit is rendered inoperative. This condition can last indefinitely and to prevent it, a modification may be made to the circuit of Figure 1, as shown in Figure 2.

Referring now to Figure 2 in which like components to those of Figure 1 are indicated by like symbols, the resistor 46 (across which the automatic gain control signal appears), instead of being returned to ground, is connected to the positive terminal B+ of the unidirectional potential source through a relatively high value resistor 49. The junction of the resistors 46, 49 is connected to the video detector 15 through a resistor 50, as shown.

The detected video signal produced by the video detector 15 has a negative polarity and a portion of this signal is introduced into the gain control circuit by means of resistors 49, 50 wherein it tends to establish an auxiliary negative direct current potential on lead 48. The values of resistors 46, 49, and 50 are so chosen that when the receiver is receiving a television signal in a normal manner, the positive direct-current potential from the unidirectional source just balances the auxiliary potential so that it has no effect upon the operation of the gain control circuit.

However, when the afore-described condition occurs wherein the amplifier 25 tends to become overloaded, the video detector 15 necessarily produces an abnormally high negative signal. The auxiliary potential on lead 48 is now no longer balanced by the positive potential from the unidirectional source and acts to decrease the gain of the receiver, reduce the amplitude of the detected video signal from detector 15 and remove the overload from the amplifier 25, so that the receiver operation returns to normal with its gain automatically stabilized as described in connection with Figure 1.

The present invention has been constructed and found to operate with a high degree of efficiency in controlling the gain of a television receiver. The following circuit values were used in one embodiment of the invention and are cited merely by way of example:

| | |
|---|---|
| Resistor 46 ................megohms.. | 1.5 |
| Resistor 49 ................do.... | 15 |
| Resistor 50 ................do.... | 0.2 |
| Potential of terminal B+ ..........volts.. | +150 |
| Average direct current potential across load resistor 21 during reception of a strong television signal ..........volts.. | —2 |

While particular embodiments of the invention have been shown and described, modifications may be made, and it is intended in the appended claims to cover all such modifications as fall within the true spirit and scope of the invention.

I claim:

1. A receiver for utilizing a television signal having video components and recurring synchronizing components having an amplitude exceeding that of the video components comprising: an electron-discharge device including an anode, a cathode and a control electrode; an input circuit connected to said cathode and control electrode for applying said television signal to said device and including means for connecting said cathode to a point of fixed reference potential; an integrating network having one terminal connected to said point of reference potential; a tuned circuit resonant at the frequency of said synchronizing components connected between another terminal of said network and said anode; a detector for said television signal; a synchronizing-signal separator coupled to said detector for separating said synchronizing components from said television signal; a network coupled to said separator for applying said synchronizing components to said tuned circuit to develop by shock excitation an anode potential of sinusoidal waveform having positive peak portions occurring in time coincidence with said recurring synchronizing components; a source of bias potential associated with said input circuit for biasing said device to anode-current cut-off except during coincidence of said recurring synchronizing components and said positive peak portions of said anode potential, whereby a control potential having amplitude variations corresponding to amplitude variations of said television signal is established in said integrating network; a further network coupled to said detector for developing an auxiliary control potential in said integrating network having an amplitude corresponding to the intensity of the signal developed by said detector; a source of potential coupled to said integrating network for developing therein a potential to counter-balance said auxiliary potential except when the intensity of the signal developed by said detector exceeds a certain threshold; and means for utilizing said control potential and said auxiliary control potential to control the gain of said receiver.

2. A receiver for utilizing a carrier wave modulated by a video signal and by a recurring synchronizing signal having an amplitude exceeding that of the video signal comprising: an electron-discharge device including an anode, a cathode and a control electrode; an input circuit connected to said cathode and control electrode for applying said carrier wave to said discharge device and including means for connecting said cathode to a point of fixed reference potential; an integrating network having one terminal connected to said point of reference potential; a tuned circuit resonant at the frequency of said synchronizing signal connected between another terminal of said network and said anode; a detector for said carrier wave for developing a detected signal negative with respect to said reference potential; a synchronizing-signal separator coupled to said detector for separating said synchronizing signal from said detected signal; a network coupled to said separator for applying said synchronizing signal to said tuned circuit to develop by shock excitation an anode potential of sinusoidal waveform having positive peak portions occurring in time coincidence with said recurring synchronizing signal; a source of bias potential associated with said input circuit for biasing said device to anode-current cut-off except during coincidence of said recurring synchronizing signal and said positive peak portions of said anode potential, whereby a control potential negative with respect to said reference potential and having amplitude variations corresponding to amplitude variations of said carrier wave is established in said integrating network; a further network coupled to said detector for developing an auxiliary control potential in said integrating network negative with respect to said reference potential and having an amplitude corresponding to the intensity of said detected signal; a source of potential coupled to said integrating network for developing therein a positive potential to counter-balance said auxiliary potential except when the intensity of said detected signal exceeds a certain threshold; and means for utilizing said control potential and said auxiliary control potential to control the gain of said receiver.

3. A receiver for utilizing a television signal having video components and recurring synchronizing components having an amplitude exceeding that of the video components comprising: a video detector; an automatic gain control system including an electron-discharge device having a control electrode and further including an integrating network for developing a control potential having amplitude variations corresponding to amplitude variations of an applied signal; means for applying said television signal to said control electrode; a gating signal source synchronized with said synchronizing components for applying a gating signal to said discharge device to render said control system sensitive solely during the intervals of said synchronizing components; a circuit coupled to said detector and to said integrating network for developing in said network an auxiliary control potential having an amplitude corresponding to the intensity of the output signal of said detector; a source of potential coupled to said integrating network for establishing therein a potential to counterbalance said auxiliary potential except during operating intervals in which the intensity of the output signal of said detector exceeds a certain threshold value; and means for utilizing the resulting potential of said integrating network to control the gain of said receiver.

4. A receiver for utilizing a television signal having video components and recurring synchronizing components having an amplitude exceeding that of the video components comprising: a video detector; an automatic-gain-control system including an electron-discharge device having a control electrode and further including an integrating network for developing a control potential having amplitude variations corresponding to amplitude variations of an applied signal; means for applying said television signal to said control electrode; a synchronizing-signal separator for separating said synchronizing components from said television signal; a gating-signal source coupled to and energized by said separator for applying a gating signal to said discharge device to render said control system sensitive solely during the intervals of said synchronizing components; a circuit coupled to said detector and to said integrating network for developing in said network an auxiliary control potential having an amplitude corresponding to the intensity of the output signal of said detector; a source of potential coupled to said integrating network for establishing therein a potential to counter-balance said auxiliary potential except during operating intervals in which the intensity of the output signal of said detector exceeds a certain threshold value; and means for utilizing the resulting potential of said integrating network to control the gain of said receiver.

References Cited in the file of this patent

UNITED STATES PATENTS

| Number | Name | Date |
|---|---|---|
| 2,227,056 | Blumlein et al. | Dec. 31, 1940 |
| 2,251,929 | Freeman et al. | Aug. 12, 1941 |
| 2,307,218 | Hardwick | Jan. 5, 1943 |
| 2,481,045 | Schroeder | Sept. 6, 1949 |
| 2,498,839 | Hayward | Feb. 28, 1950 |
| 2,559,038 | Bass | July 3, 1951 |
| 2,586,760 | Bedford | Feb. 19, 1952 |
| 2,593,011 | Cotsworth | Apr. 15, 1952 |
| 2,606,247 | Fyler | Aug. 5, 1952 |

FOREIGN PATENTS

| Number | Country | Date |
|---|---|---|
| 848,207 | France | Oct. 25, 1939 |